United States Patent [19]

Bird

[11] 4,168,814
[45] Sep. 25, 1979

[54] INSPECTION AND MAINTENANCE TROLLEY FOR AIRCRAFT

[75] Inventor: Donald M. Bird, Bellevue, Wash.

[73] Assignee: The Boeing Company, Seattle, Wash.

[21] Appl. No.: 882,531

[22] Filed: Mar. 1, 1978

[51] Int. Cl.² ............................................. B64D 47/00
[52] U.S. Cl. ................. 244/118 P; 244/1 R; 244/129.1
[58] Field of Search ........... 244/117 R, 118 R, 118 P, 244/119, 120, 106, 36, 125, 129.1, 1 R; 104/94, 242–247; 109/9

[56] References Cited

U.S. PATENT DOCUMENTS

| | | | |
|---|---|---|---|
| 1,440,588 | 1/1923 | Feucht | 104/247 |
| 2,925,050 | 2/1960 | Candlin, Jr. et al. | 244/119 |
| 3,028,130 | 4/1962 | Burton | 244/118 R |
| 3,179,208 | 4/1965 | Umanoff | 244/118 P |
| 3,774,864 | 11/1973 | Hurkamp | 244/36 |
| 4,112,818 | 9/1978 | Garehime, Jr. | 244/118 P |

OTHER PUBLICATIONS

Washington Star, Mar. 24, 1947, "World's Highest Subway," p. A7.

*Primary Examiner*—Galen L. Barefoot
*Attorney, Agent, or Firm*—Thomas H. Murray

[57] ABSTRACT

The method and apparatus for conducting inspections and maintenance activities of this invention reduce the time required to conduct inspections and perform maintenance upon the aircraft structure and various systems, such as electrical and hydraulic, contained within the confined space located beneath the main deck of an aircraft by providing ease of movement for the individual and his tools. Additionally, this invention reduces the hazards associated with movement through the confined space and bulkheads under the main deck of an aircraft. The inspection and maintenance apparatus of this invention includes a trolley of proper size for a person and tools mounted upon parallel rails which are contained and extend longitudinally within the confined space under the main deck of an aircraft. The trolley is placed upon the rails at mounting points which are located under access panels in the main deck of the aircraft. The trolley is then moved longitudinally along the rails carrying the individual inspector or mechanic with his tools to the appropriate location under the main deck of the aircraft. When not in use, the trolley may be removed from the aircraft for storage thereby reducing aircraft weight.

1 Claim, 7 Drawing Figures

INSPECTION AND MAINTENANCE TROLLEY FOR AIRCRAFT

BACKGROUND OF THE INVENTION

1. Field of the Invention

This invention relates particularly to aircraft and will be described in terms of use for aircraft; however, its use is not limited thereto. This invention relates to a method and apparatus designed to transport an individual and his tools and equipment throughout the confined space located beneath the floor or main deck of an aircraft in order to service the aircraft structure and various aircraft systems contained therein. It would also be applicable to other areas requiring inspection and maintenance wherein the space available for movement is restricted.

2. Description of the Prior Art

The current and conventional method or procedure for inspecting, maintaining and servicing the aircraft structure and systems, such as electrical and hydraulic, which are located throughout the confined elongated space located beneath the main deck of an aircraft, is to provide either a series of access panels in the main deck or a crawl space through the bulkheads which are located beneath the main deck. If the access panel is used, several panels may require removal in order to properly inspect or service the particular portion of the structure or system. This involves considerable effort and time just to reach the area requiring maintenance. Furthermore, all panels removed must be replaced upon completion of service, necessitating additional time and effort. If the crawl space technique is chosen, only one access panel need be removed. However, crawling through the space located beneath the main deck to reach the system requiring service may entail considerable time as movement through the space is slowed by the constrictions therein and by the requirement to proceed cautiously to avoid injury to the person or damage to the systems. There is a need, therefore, for a method and apparatus to provide safe, efficient access to the aircraft structure and systems requiring service and which are located beneath the main deck of an aircraft.

SUMMARY OF THE INVENTION

This invention relates to a method and apparatus for conducting inspection, maintenance and service of aircraft structure and systems, such as electrical and hydraulic controls. Specifically, this invention relates to techniques for obtaining efficient and safe access to those structural elements and systems which are contained within confined spaces, such as those located under the main deck, in spar wing areas, or in overhead (above ceiling) areas. The method by which this invention provides access is by a transportation system designed to safely and efficiently transport the individual inspector or mechanic and his tools to the location requiring service. The apparatus to accomplish this method is a trolley of proper size to carry a person and his tools. The trolley is supported on rollers which enable it to be placed upon a pair of parallel rails mounted within a confined space which contains the structural element or system requiring service. There may be one or more pairs of parallel rails, depending upon the size of the aircraft and the number of systems. The trolley is placed upon or removed from the rails through an opening under the access panel. Removal of the trolley allows storage apart from the aircraft, thereby reducing aircraft weight. With the trolley placed upon the rails, an inspector or mechanic can position himself and his tools upon the trolley and move quickly and safely to the location of the required service. Propulsion can be by motorized means incorporated on the trolley or self-propulsion.

The objects and advantages of this invention will be more completely disclosed and described in the following specification, the accompanying drawings, and the appended claims.

DESCRIPTION OF THE PREFERRED EMBODIMENT

Figure 1:
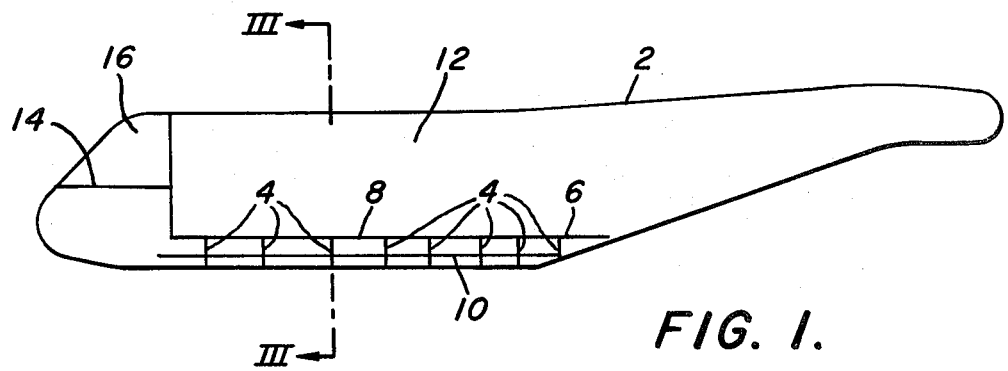
FIG. 1 is a diagrammatic view, in side elevation, of an aircraft fuselage showing a specific embodiment of the invention claimed.

Referring to the drawings in detail, it will be seen that FIG. 1 illustrates an aircraft fuselage generally designated by the numeral 2 with a cargo or passenger compartment 12, a cockpit area 16 and a flight deck 14. There is a plurality of bulkheads 4 extending laterally across the space 8 located beneath the main deck 6. The bulkheads 4 are parallel to each other and located so as to divide space 8 into compartments and to provide sufficient rigidity and strength to the fuselage 2 and main deck 6.

Contained within space 8 are two parallel rail members 10 which extend longitudinally through space 8. Openings 18 in bulkheads 4 are sufficiently large to allow trolley 20 carrying an individual and tools to pass through unobstructed. Parallel rail members 10 are securely fastened to bulkheads 4 by mounting means 38.

Figure 4:
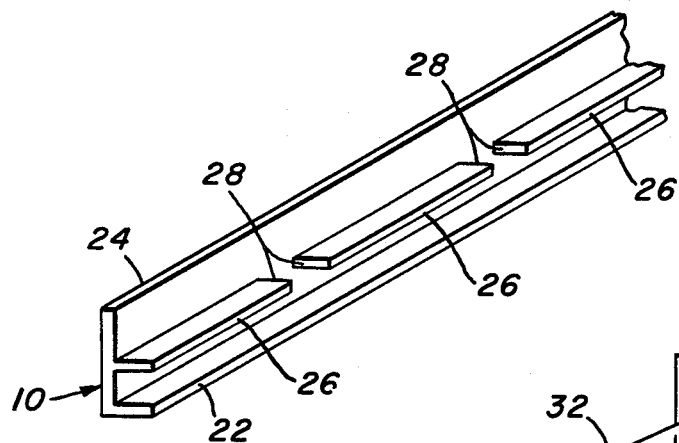
FIG. 4 is a perspective view of one of the rails.
Figure 6:
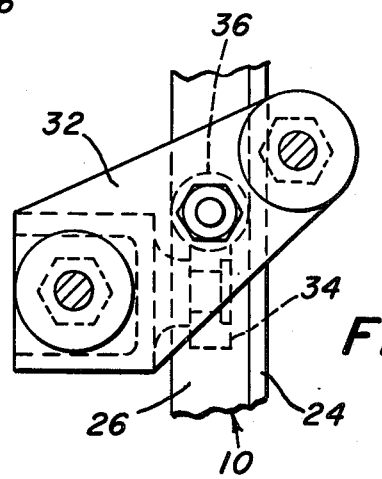
FIG. 6 is a plan view taken along line VI—VI of FIG. 5 illustrating a trolley roller.
Figure 5:
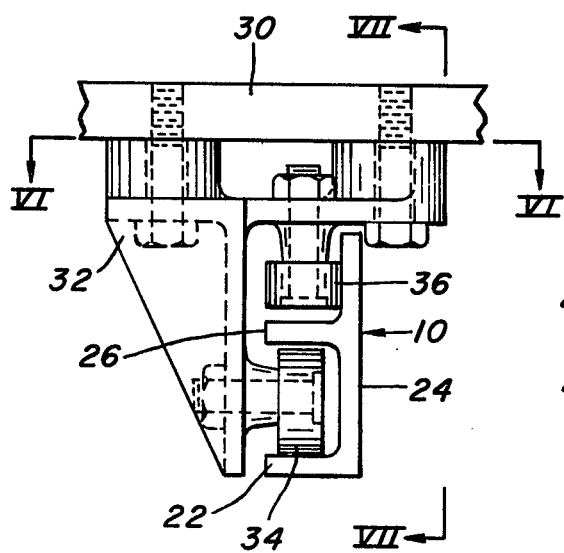
FIG. 5 is a sectional view, in end elevation, of a trolley roller mounted on a rail.
Figure 7:
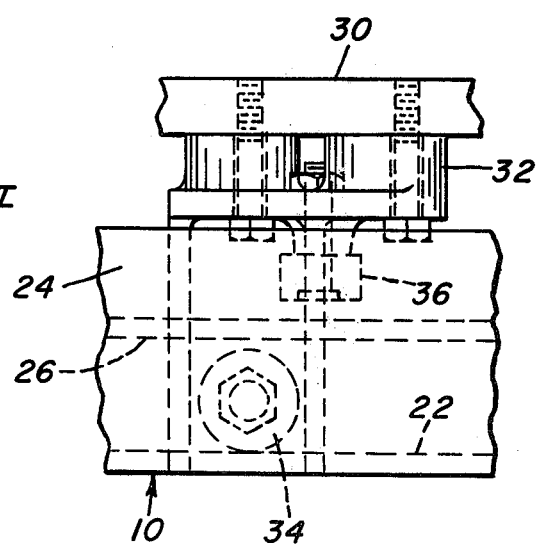
FIG. 7 is a sectional view, in side elevation, taken along line VII—VII of FIG. 5 illustrating a trolley roller.

As illustrated in FIG. 4, the rails 10 are comprised of one vertical member 24 joined by two parallel horizontal flange members 22 and 26. Horizontal flange member 26 is interrupted by cutouts 28 spaced to accept trolley rollers which are illustrated in FIGS. 5–7. Parallel rail members 10 are arranged such that trolley 20 can carry an inspector or mechanic and his tools through the confined space under main deck 6 for purposes of detecting and/or repairing defects in the aircraft systems contained within space 8.

The trolley 20 consists of a platform 30 and rollers which are illustrated in FIGS. 5–7. The rollers consist of a roller body portion 32 which is secured to the platform 30 by fastening means and has rotatably mounted wheel members 34 and 36 secured to body portion 32 which move longitudinally along horizontal flange members 22 and vertical members 24, respectively, of parallel rail members 10 after being placed on parallel rail members 10 through cutouts 28. Suitable locking means and propulsion means may be provided for wheels 34 and/or 36 on the trolley 20.

Figure 2:
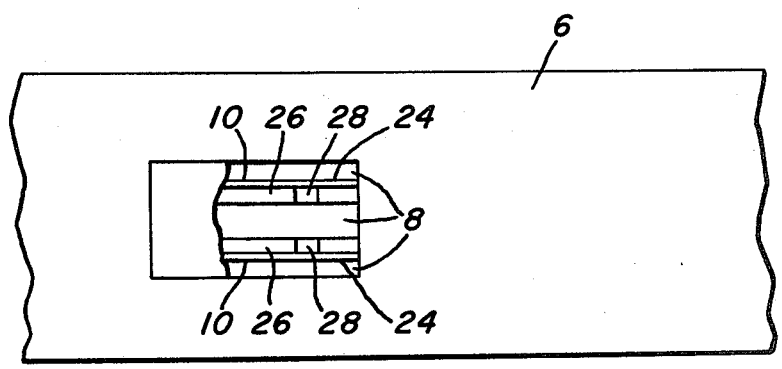
FIG. 2 is a fragmentary plan view of the main deck in an aircraft.
Figure 3:
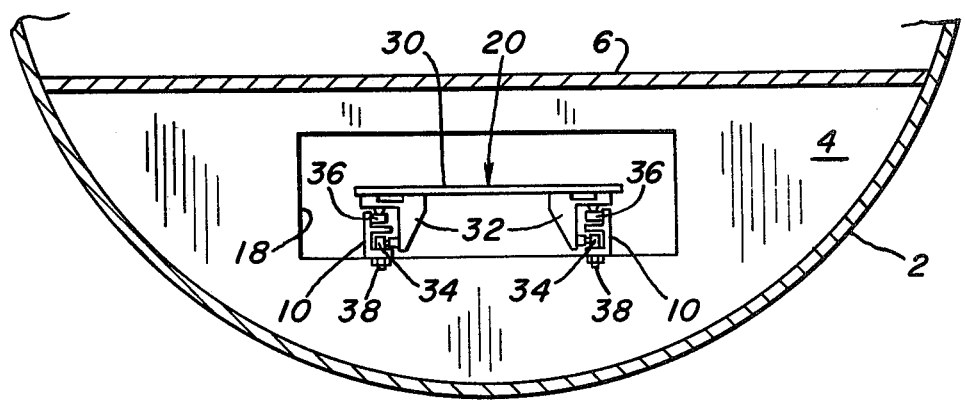
FIG. 3 is a fragmentary transverse sectional view taken along line III—III of FIG. 1.

For inspections or maintenance activities, the trolley 20 is inserted through an access panel 13 (FIG. 2) in the main deck 6 of the aircraft and placed on the parallel rail members 10 through cutouts 28. The inspector or mechanic, accompanied by necessary tools, positions himself on the platform 30 of trolley 20. By using suitable propulsion means, the inspector or mechanic moves longitudinally along the parallel rail members 10 under main deck 6 to reach the location of aircraft structure or system requiring service. It should be apparent that movement within space 8 beneath the main deck 6 can be accomplished with improved speed and decreased physical exertion thereby enabling the inspector or mechanic to more efficiently complete his task. Additionally, it should be apparent that by not having to crawl through space 8 under main deck 6 or climb through the openings 18 in bulkheads 4, the danger of injury to the person or damage to systems is considerably lessened.

After completion of inspections or maintenance activities, the trolley 20 is removed by reversing the process previously described. In this manner the trolley may be stored apart from the aircraft, thereby resulting in a weight savings.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. A method for the inspection, maintenance and service of aircraft structural elements and systems contained in space between the skin of an aircraft and the main compartment and extending longitudinally through the aircraft which comprises:

removing an access panel from an opening into said space;

emplacing a trolley having a platform and rollers supporting said platform through said opening and inserting said rollers through cutouts in an upper flange of a pair of parallel rails extending longitudinally through said space with said rollers engaging a lower flange of said parallel rails;

positioning a person and tools upon said trolley;

propelling said trolley along said rails to the location within said space requiring inspection, maintenance and service;

conducting said inspection, maintenance and service; and reversing the aforesaid steps to include replacing the access panel.

* * * * *